United States Patent [19]

Brown, Jr. et al.

[11] Patent Number: 5,377,112
[45] Date of Patent: Dec. 27, 1994

[54] METHOD FOR DIAGNOSING AN ENGINE USING COMPUTER BASED MODELS

[75] Inventors: William L. Brown, Jr., Dunlap; W. Kent Rutan, Sparland; David R. Schricker, Peoria, all of Ill.

[73] Assignee: Caterpillar Inc., Peoria, Ill.

[21] Appl. No.: 934,642

[22] PCT Filed: Dec. 19, 1991

[86] PCT No.: PCT/US91/09322
§ 371 Date: Dec. 19, 1991
§ 102(e) Date: Dec. 19, 1991

[87] PCT Pub. No.: WO93/12332
PCT Pub. Date: Jun. 24, 1993

[51] Int. Cl.⁵ .................................. F02B 37/12
[52] U.S. Cl. .................. 364/431.12; 364/431.02; 364/424.03; 364/431.01; 73/117.3; 73/118.2; 60/603; 60/608; 123/357; 123/486
[58] Field of Search .......... 364/424.03, 431.01, 364/424.04, 550, 900; 60/608, 607, 597; 123/357, 373, 385; 74/859, 860

[56] References Cited

U.S. PATENT DOCUMENTS

| | | | |
|---|---|---|---|
| 3,721,120 | 3/1973 | Howell et al. | 73/117.3 |
| 4,368,705 | 1/1983 | Stevenson et al. | 123/357 |
| 4,604,701 | 8/1986 | Fujawa et al. | 364/431.01 |
| 4,616,616 | 10/1986 | Staniak et al. | 123/357 |
| 4,621,335 | 11/1986 | Bluish et al. | 364/550 |
| 4,630,189 | 12/1986 | Ohmori et al. | 364/150 |
| 4,671,107 | 6/1987 | Chiesa et al. | 73/118.2 |
| 4,736,715 | 4/1988 | Larsen | 123/64 |
| 4,882,905 | 11/1989 | Kawamura | 60/608 |
| 4,901,530 | 2/1990 | Kawamura | 60/608 |
| 4,953,110 | 8/1990 | Chartrand | 364/550 |
| 4,964,318 | 10/1990 | Ganoung | 74/859 |
| 5,010,487 | 4/1991 | Stonehocker | 364/424.03 |
| 5,205,125 | 4/1993 | Potter | 60/602 |

FOREIGN PATENT DOCUMENTS 0142101 10/1984 European Pat. Off. .
0231155 1/1987 European Pat. Off. .

Primary Examiner—Thomas G. Black
Assistant Examiner—Jacques H. Louis-Jacques
Attorney, Agent, or Firm—James R. Yee

[57] ABSTRACT

A method for diagnosing an engine (102) including the steps of sensing a first set of parameters of the engine (102) and determining a modeled value of a first operating characteristic. A second set of parameters of the engine (102) is sensed and used to determined a modeled value of a second operating characteristic. The modeled values are compared to actual values and the engine is responsively diagnosed.

53 Claims, 11 Drawing Sheets

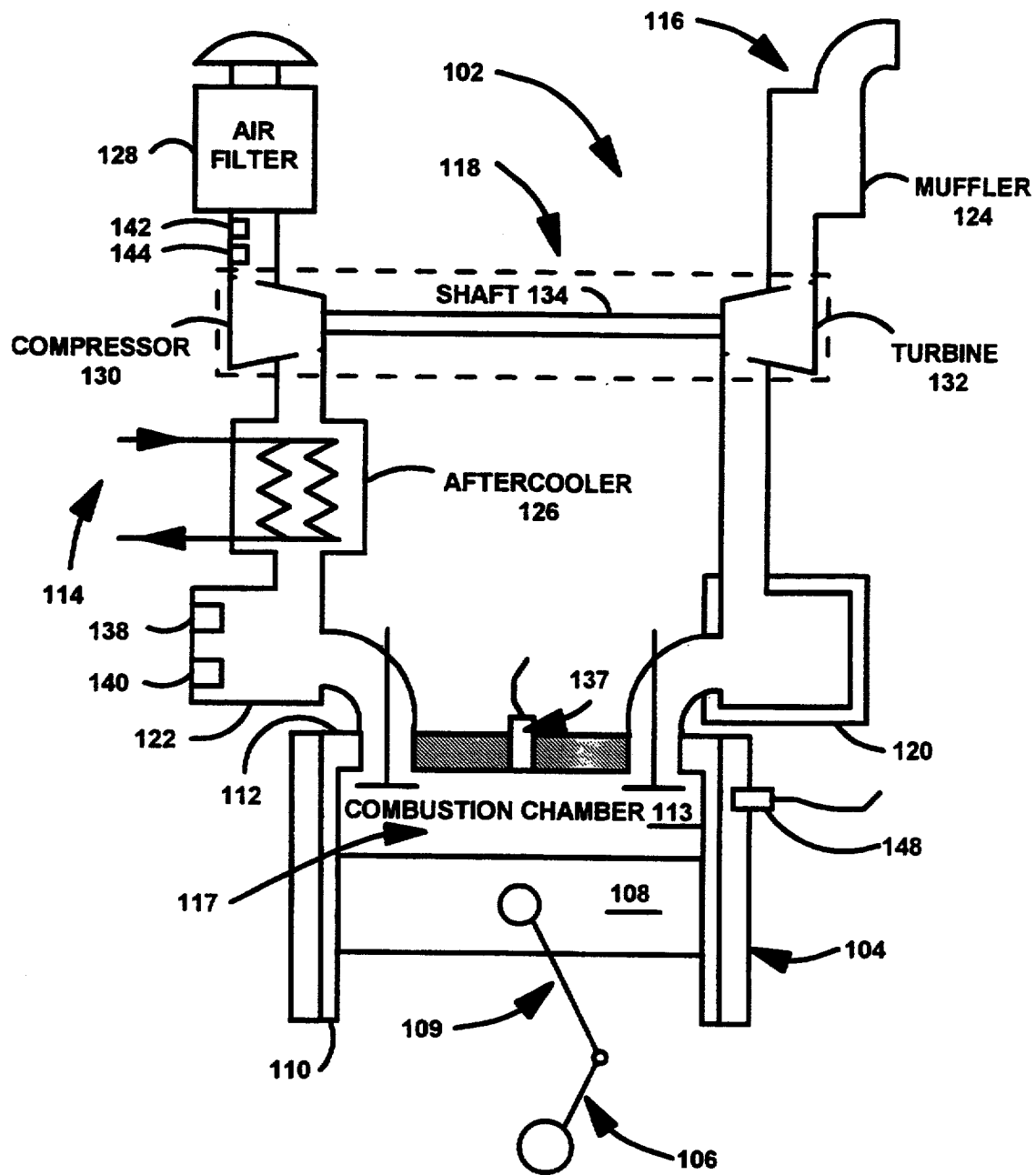
Fig_1_

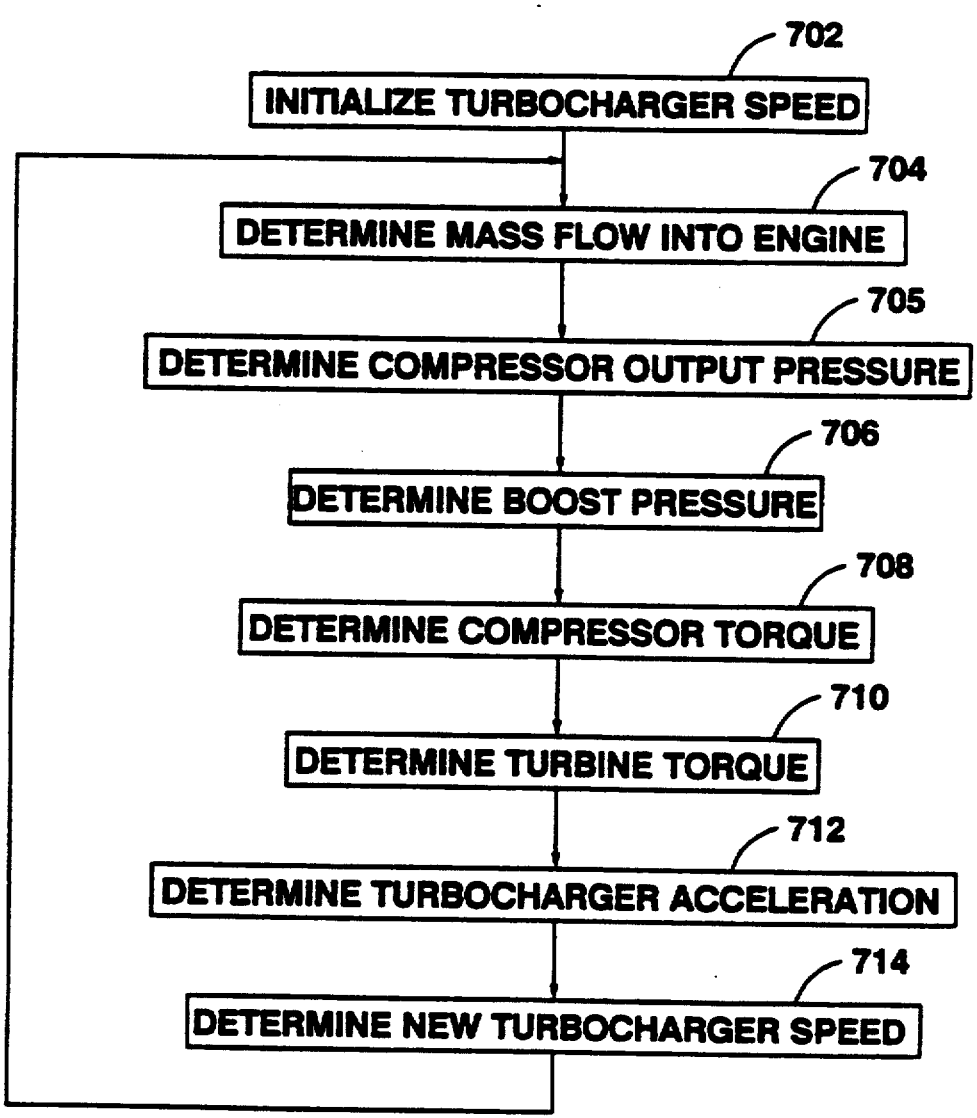
Fig_7_
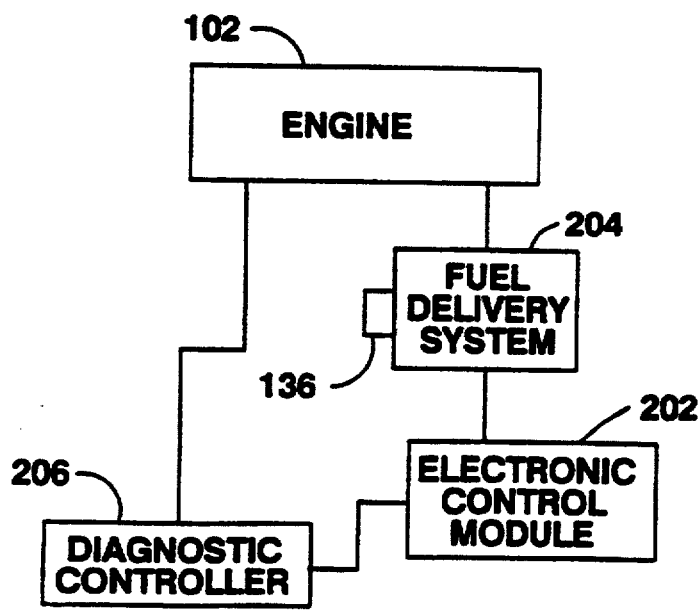
Fig_2_

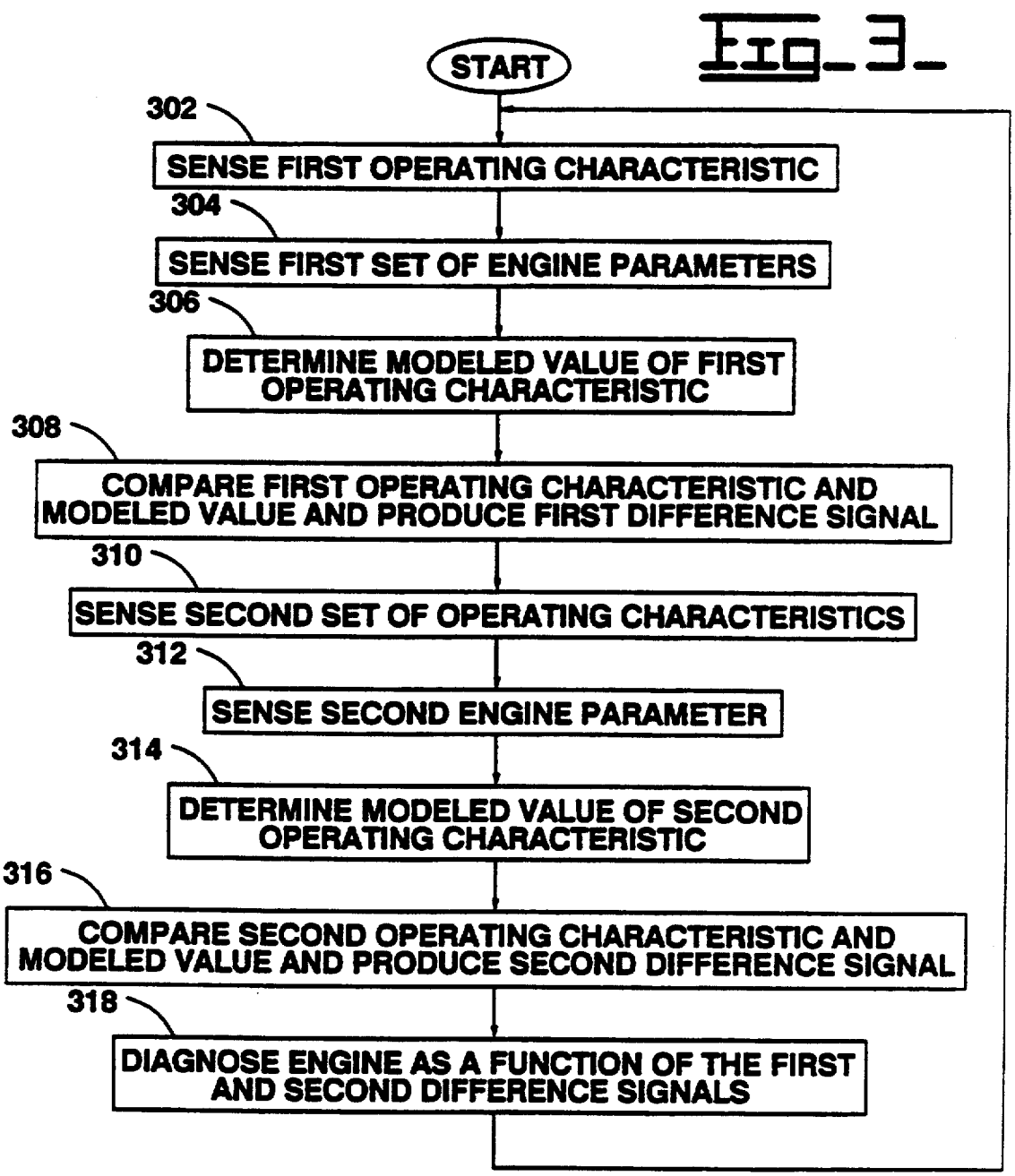
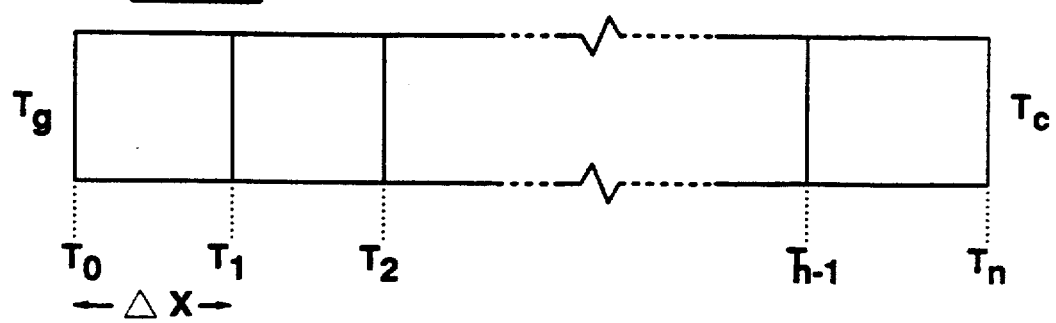

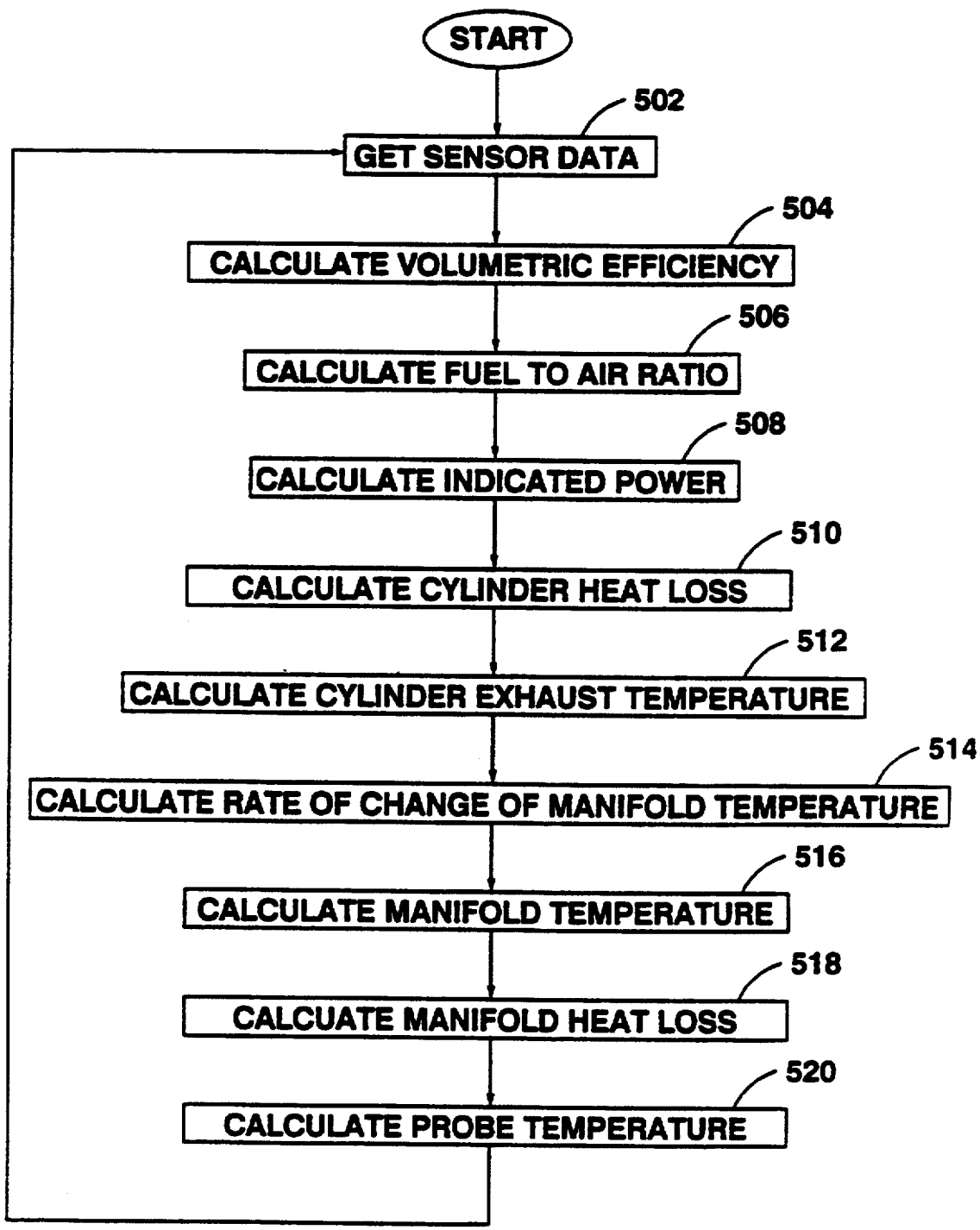
Fig_5_

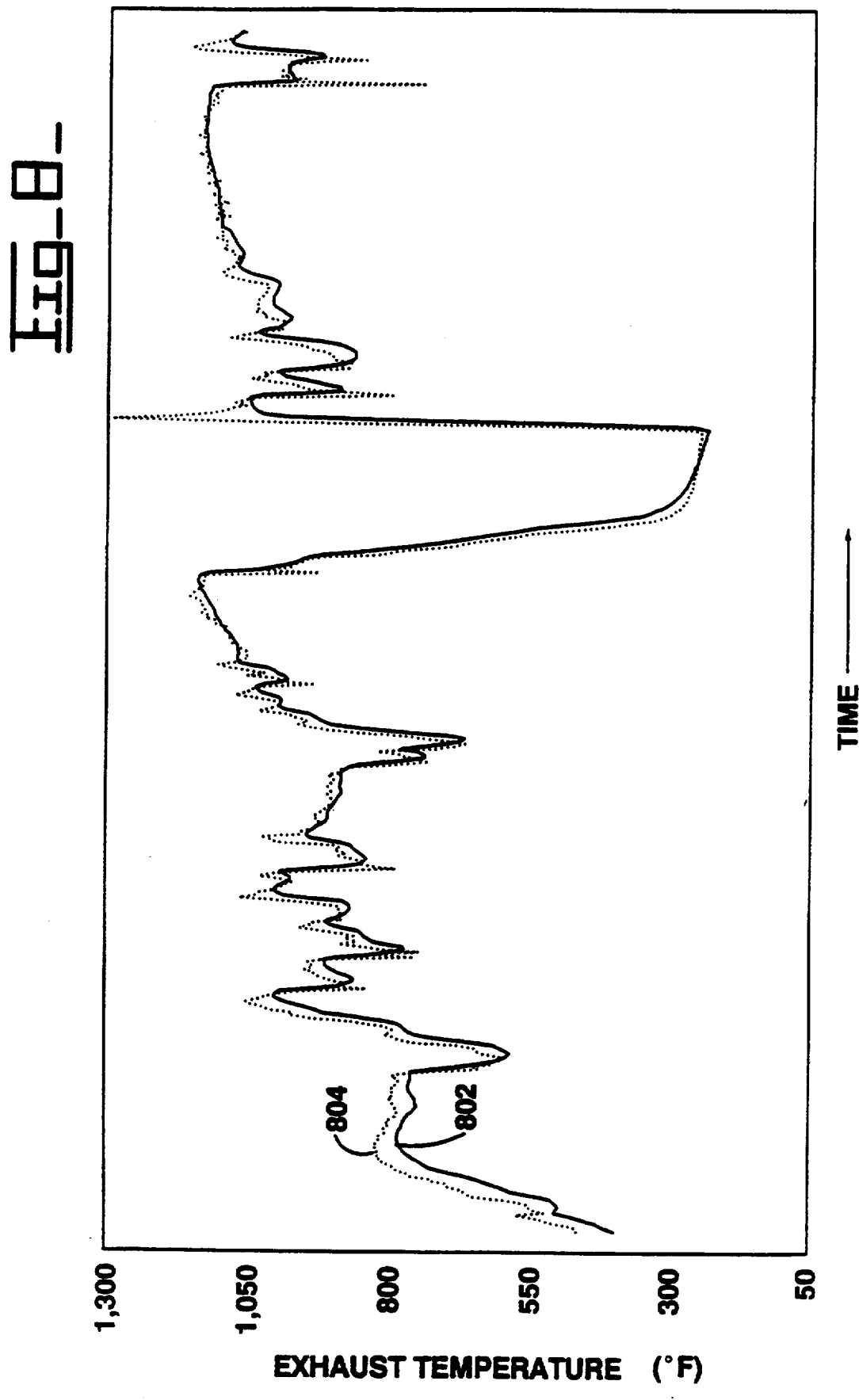

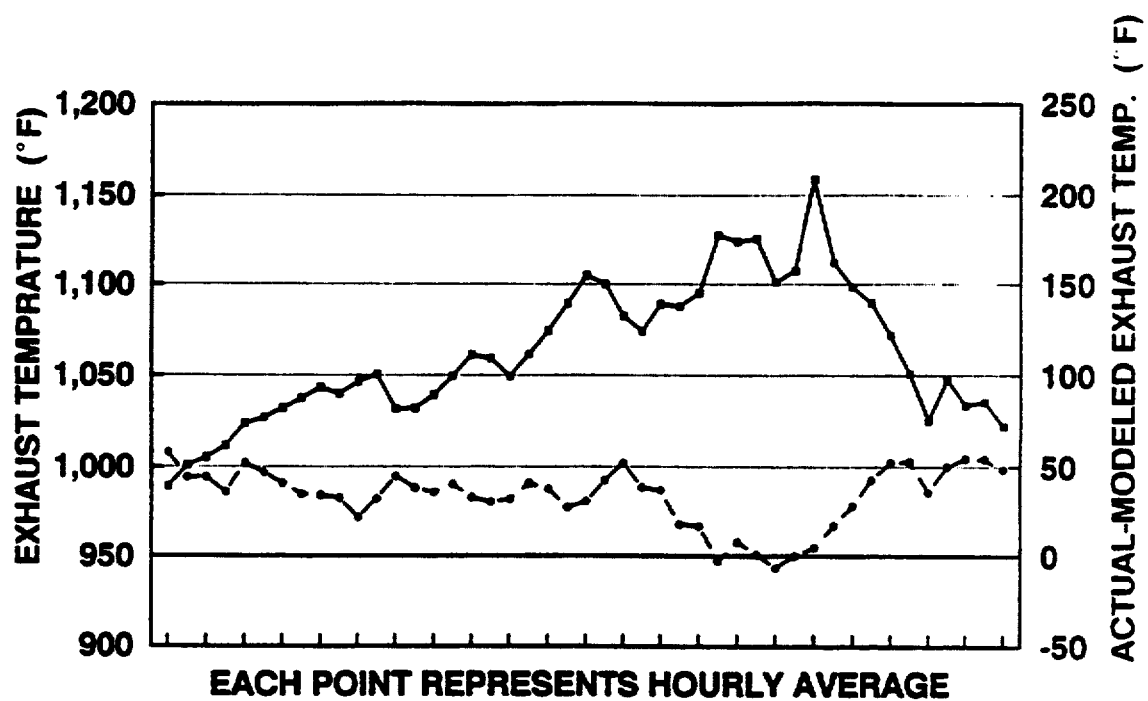
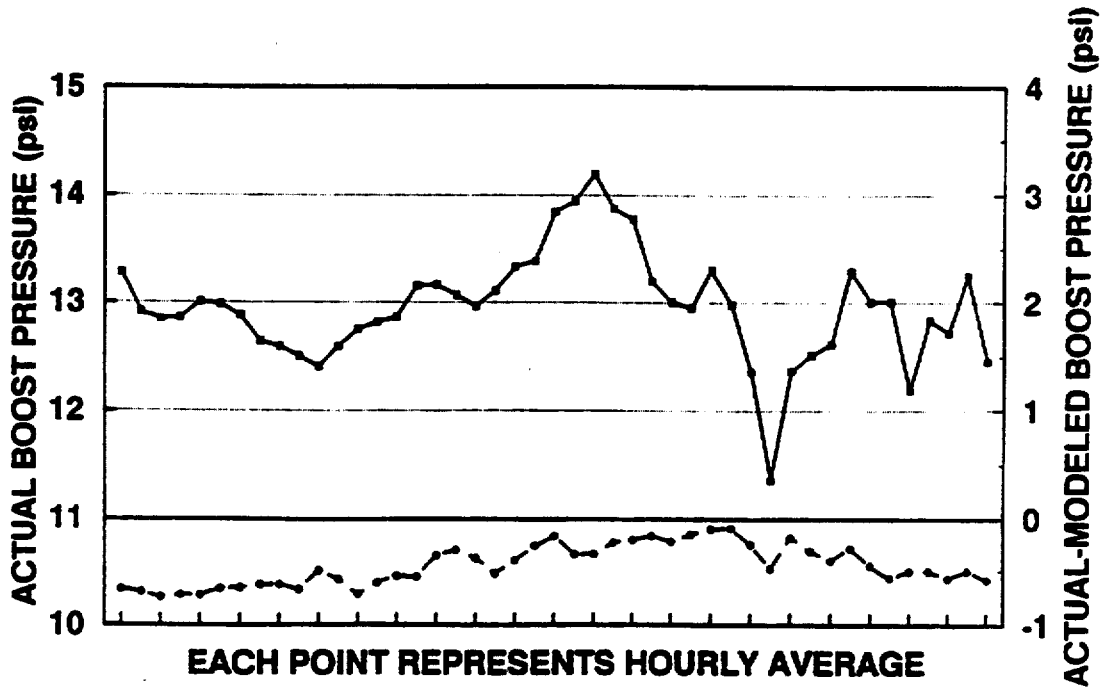

| FAULT INDUCED | BOOST SHIFT (psi) | EXHAUST SHIFT (C) | INCREASE IN BSFC (%) |
|---|---|---|---|
| INTAKE MAN LEAK 1/2" HOLE | -2.1 | 17 | 2.8 |
| INTAKE MAN LEAK 5/8" HOLE | -3.5 | 23 | 4.2 |
| NO ADVANCE | 0.1 | 100 | 8.4 |
| LOW FUEL PRES. | 0.0 | -85 | (-15% POWER DROP) |
| NOZZLE PATTERN | -0.2 | 10 | 2.0 |
| VALVE LASH TIGHT INTAKE 50% SPEC EXHAUST 50% SPEC | -0.35 | 30 | 0.1 |
| VALVE LASH LOOSE1 INTAKE 150% SPEC EXHAUST 150% SPEC | 0.30 | 15 | 0.1 |
| VALVE LASH LOOSE2 INTAKE AT SPEC EXHAUST 200% SPEC | -0.10 | 10 | 1.8 |

Fig-12

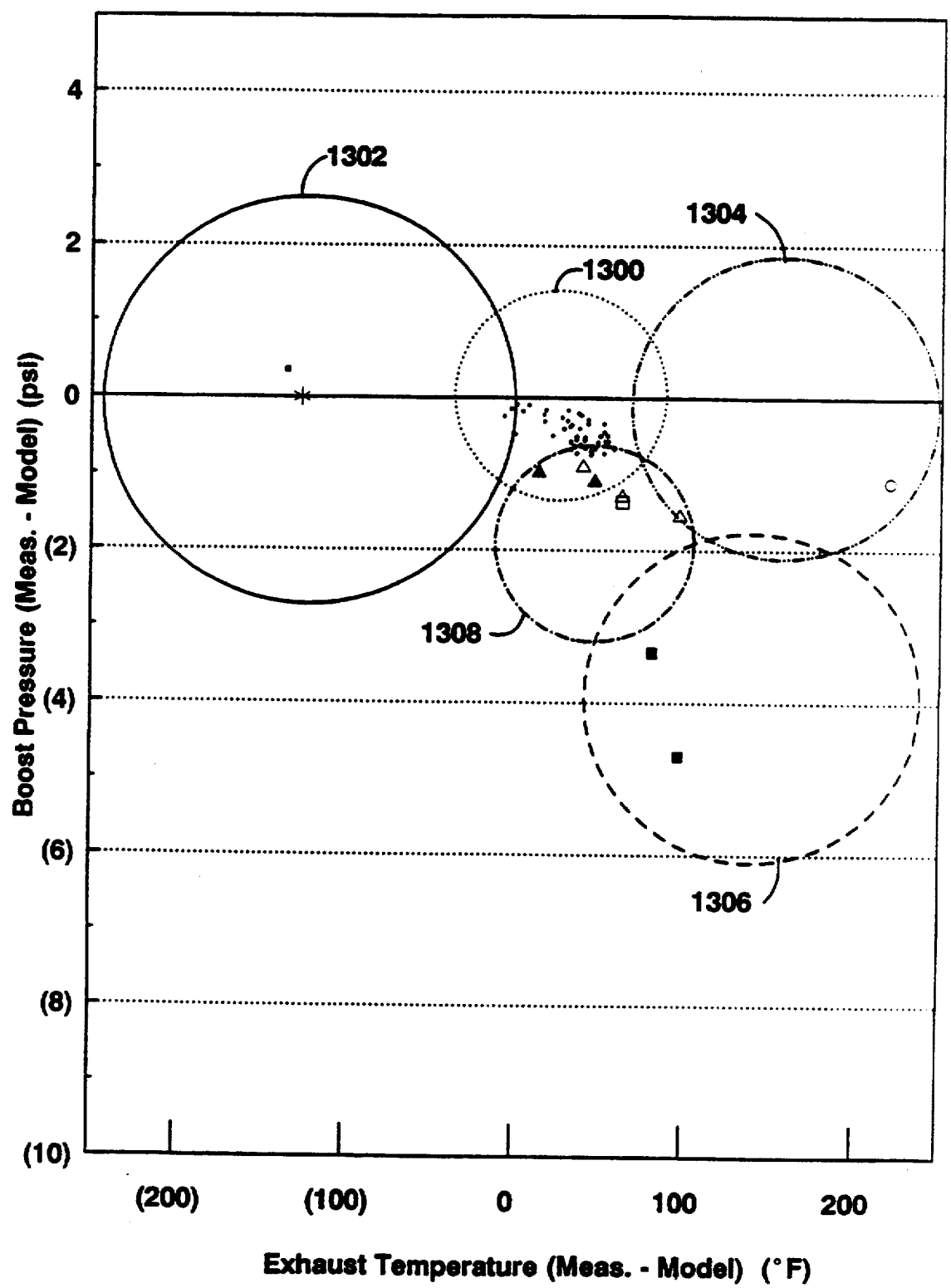
Fig_13_

| ○ NORMAL-FIELD DATA | ○ NO ADVANCE |
| ▲ NORMAL-LAB DATA | ■ INTAKE MANIFOLD LEAK |
| ■ DISABLED INJECTOR | □ BAD NOZZLES |
| △ VALVES | ∗ LOW FUEL PRESSURE |

LEGEND

Fig_13A_

METHOD FOR DIAGNOSING AN ENGINE USING COMPUTER BASED MODELS

TECHNICAL FIELD

This invention relates generally to a method for diagnosing an engine, and more particularly to a method for diagnosing an engine using computer based models of engine characteristics.

BACKGROUND ART

Proper maintenance of a vehicle's engine is an important priority in the daily operation of a vehicle. Without proper maintenance minor problems can escalate into major mechanical failures, resulting in costly downtime and expensive repairs.

Typically, when an operator observes a performance loss or loss of power in a vehicle's engine, the vehicle is brought into the shop for testing and repair.

Unfortunately, the best time to diagnose power-related problems is during typical driving conditions. In the shop, test data may be collected using a dynamometer. However, this data is really only useful for verifying that a power problem exits. It does not necessarily locate the problem.

Therefore, the best way to diagnose the engine is by collecting data during operation and analyzing the data. Generally, this type of analysis has been confined to collecting the data and comparing the data to normal ranges or by comparing graphs of the data to standard or normal graphs. The problem with this type of method is that it does not provide on-board or real-time diagnostics. It also requires that an operator recognize a loss of power and that the vehicle is brought in for maintenance. Furthermore, it requires a great amount of skill and knowledge to equate deviations in the engine parameters to a type of problem or the location of the problem.

The subject invention is directed at overcoming one or more of the problems as set forth above.

DISCLOSURE OF THE INVENTION

In one aspect of the present invention, a method for diagnosing an engine is provided. The method includes the steps of sensing a parameter of the engine and determining a modeled value of a first operating characteristic based on the sensed parameter, sensing the actual value of the first operating characteristic, comparing the actual characteristic value and the modeled characteristic value and producing a first difference signal. Another parameter of the engine is sensed and a modeled value of a second operating characteristic is determined. The actual value of the second operating characteristic and the modeled value are compared and a second difference signal is produced. The engine is diagnosed as a function of the first and second difference signals.

In another aspect of the present invention, a method for diagnosing an engine having an exhaust manifold and a turbocharger is provided. The method includes the steps of sensing the exhaust temperature of the engine, sensing a parameter of the engine, and responsively determining a modeled value of the exhaust temperature, comparing the actual and modeled values and responsively producing a first difference signal. The method further includes the steps of sensing the boost pressure of the turbocharger, sensing a second parameter of the engine and responsively determining a modeled value of the boost pressure, comparing the modeled and actual values of the boost pressure and responsively determining a second difference signal. The first and second difference signals are used to diagnose the engine.

BRIEF DESCRIPTION OF THE DRAWINGS

FIG. 1 is a stylized representation of an engine having a combustion system, an air intake system and an exhaust system;

FIG. 2 is a block diagram of a diagnostic system, according to an embodiment of the present invention;

FIG. 3 is a flow diagram illustrating the operation of the computer based exhaust temperature model, according to an embodiment of the present invention;

FIG. 5 is a flow diagram illustrating the operation of the exhaust temperature model, according to an embodiment of the present invention;

FIG. 6 is a stylized representation of the cylinder wall of the engine, illustrating temperature distribution;

FIG. 7 is a flow diagram illustrating the operation of the boost pressure model, according to an embodiment of the present invention;

FIG. 8 is a graph of actual exhaust temperature and modeled exhaust temperature during operation of the engine versus time;

FIG. 10 is a graph illustrating actual exhaust temperature and the difference between actual exhaust temperature and modeled exhaust temperature versus time;

FIG. 11 is a graph illustrating actual boost pressure and actual boost pressure minus modeled boost pressure versus time;

FIG. 12 is a table illustrating the effects of a number of induced faults on the boost pressure model, the exhaust pressure model, and brake specific fuel consumption (BSFC);

FIG. 13 is a graph illustrating the difference between actual exhaust temperature and modeled temperature versus the difference between actual boost pressure and modeled boost pressure; and FIG. 13A, is a legend for the graph of FIG. 13.

BEST MODE FOR CARRYING OUT THE INVENTION

Figure 4:
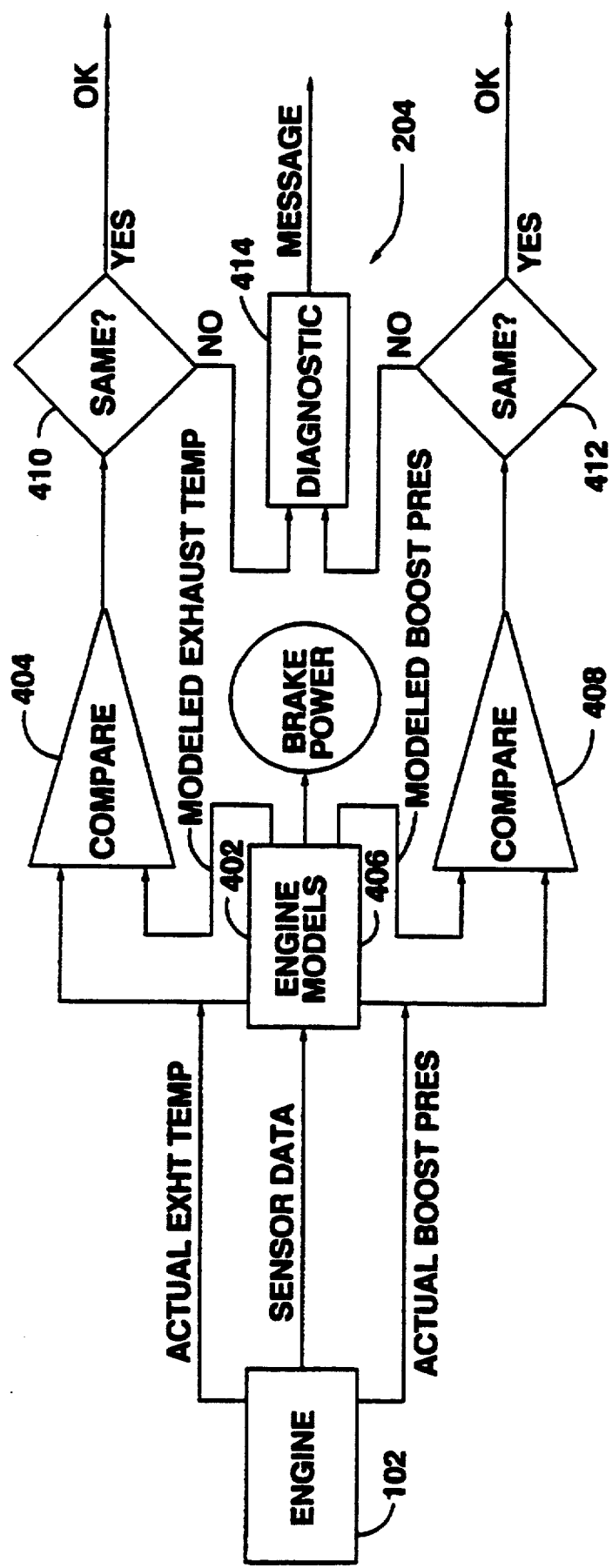
FIG. 4 is a block diagram showing the flow of information between the exhaust temperature model and the boost pressure model, according to an embodiment of the present invention.

With reference to FIG. 1, the present invention is adapted to diagnose an engine 102. As shown in the stylized representation of the engine 102, the engine includes an air intake system 114, an exhaust system 116, a combustion system 117, and a turbocharger 118. The air intake system 114 includes an air filter or cleaner 128, an aftercooler 126, and an air intake manifold 122. The exhaust system 116 includes an exhaust manifold 120 and a muffler 124.

The turbocharger 118 includes a compressor 130, a turbine 132, and a shaft 134. The compressor 130 is connected into the air intake system 114 between the aftercooler 126 and the air filter 128. The turbine 132 is connected into the exhaust system 116 between the exhaust manifold 120 and the muffler 124. The shaft 134 connects the compressor 130 to the turbine 132.

The combustion system 117 includes a plurality of cylinders 104 and a crankshaft 106. Each cylinder 104 has an associated piston 108 and piston rod 109. For the purposes of illustration, only one cylinder 104, piston 108, and piston rod 109 are shown. Each cylinder 104 includes a cylinder liner 110. Each cylinder 104 may also include a cylinder head 112 or a common head arrangement may be used. The piston 108, cylinder liner 110, and cylinder head 112 form a combustion chamber 113. The cylinder head 112 forms a passageway from the air intake manifold 122 and the exhaust manifold 120 to the combustion chamber 113. The cylinder head 112 also forms a passageway, allowing a fuel delivery system to introduce fuel into the combustion chamber 113. In the preferred embodiment, fuel is injected into the combustion chamber 113 by an electronic fuel injector 137.

With reference to FIG. 2, the engine 102 is typically controlled by an electronic control module (ECM) 202. The ECM 202 includes a fuel delivery system 204. Typically, the fuel delivery system 204 includes a fuel injection system or a electronic governor. The electronic governor 204 controls the amount of fuel delivered to the engine.

A diagnostic controller 206 receives information from the ECM 202 and directly from sensors connected to the engine 102 and uses the engine information to diagnose the engine 102 (as discussed below).

Referring to FIGS. 1 and 2, in the preferred embodiment, the diagnostic controller 206 receives information from a fuel temperature sensor 136, an intake manifold pressure (boost pressure) sensor 138, an intake manifold temperature sensor 140, a filtered air pressure sensor 142, a filtered air temperature sensor 144, and an exhaust temperature sensor or probe 146. It should be noted however that some of the sensors 136–146 transmit sensor information to the ECM 202. For those sensors, the diagnostic controller 206 receives the information from the electronic control module 202. Additionally, a temperature sensor (not shown) is used to sense the temperature of the coolant.

Furthermore, the ECM 202 may also transmit other sensor information and other calculated engine parameters to the diagnostic controller 206. For example, the ECM 202 calculates the mass flow rate of fuel into the engine 102 as a function of engine speed (measured) and rack position or RACK. Note that the term RACK is used for historic purposes only. In engines controlled by an ECM, there is physically no rack. However the term, rack position (RACK) has been retained to refer to the amount of fuel delivered to the engine 102. The ECM 202 relays this information to the diagnostic controller 206. In the preferred embodiment, the ECM 202 also receives sensor information relating to engine speed, timing advance, and rack position or fuel rate and relays this information to the diagnostic controller 206.

In one embodiment, the diagnostic controller 206 includes a microprocessor capable of receiving the sensor information and performing the diagnostic routines on board the vehicle. One suitable microprocessor is available from Motorola Inc. of Roselle, Ill., as part no. MC68000.

In a second embodiment, the diagnostic controller 206 records or stores the sensor information in a memory for download into an external computer for analysis.

In a third embodiment, the diagnostic controller 206 includes a transmitter (not shown) for transmitting the data to a remote site for processing. A satellite system receives the signals from the transmitter and relays the signals to the remote cite. One suitable transmitter is the Omnitracs Mobile Messaging Communications Terminal. A suitable satellite system service is Omnitracs Message Service. Both are available from Qualcomm of San Diego, Calif.

The diagnostic controller 206 receives the parameter information from the sensors and from the ECM 202 and determines modeled values for two operating characteristics of the engine 102, compares the modeled values to actual or measured values and uses the differences to diagnose the engine 102. With reference to FIG. 3, the operation of a diagnostic controller 206 is as follows:

In a first control block 302, a first operating characteristic is sensed. In a second control block 304, a first set of engine parameters is sensed. In a third control block 306, a modeled value of the first operating characteristic is determined as a function of the first set of engine parameters. In a fourth control block 308, the modeled value and the first operating characteristic are compared and a first difference signal is produced. In a fifth control block 310, a second operating characteristic is sensed. In a sixth control block 312, a second set of engine parameters is sensed. In a seventh control block 314, a modeled value of the second operating characteristic is determined as a function of the second set of engine parameters. In an eighth control block 316, the operating characteristic and the modeled value of the second operating characteristic are compared and a second difference signal is produced. In a ninth control block 318, the engine 102 is diagnosed as a function of the first and second difference signals.

In the preferred embodiment, the first and second operating characteristics are the exhaust temperature and the boost pressure of the turbocharger 118, respectively.

With reference to FIG. 4, the operation of the diagnostic controller 206 may be more easily understood by looking at the flow of information. First, sensor information is received by the diagnostic controller 206 and used in an exhaust temperature model 402 to determine a modeled or predicted value of the exhaust temperature. From the exhaust temperature sensor 146, an actual value of the exhaust temperature is determined. The actual value and the modeled value of the exhaust temperature are compared (block 404) or subtracted and a first difference signal is produced. Other sensor information is used in a boost pressure model. The boost pressure model (406) determines a modeled or predicted value of the boost pressure of the turbocharger 118. From the boost pressure sensor 138, an actual value of the boost pressure is determined. The actual value and the modeled value of the boost pressure are compared and a second difference signal is produced (block 408).

If the exhaust temperature model and the boost pressure model return values substantially equal to the actual values, then an OK signal is output (first and second decision blocks 410,412). If the modeled and actual values are not the same then the differences are used to diagnose the engine 102 (block 414). The operation of the diagnostic controller 206 is discussed below.

In one embodiment, the exhaust temperature model and the boost pressure model run concurrently. In fact, as discussed below, portions of the models are redundant, that is, they perform some of the same calculations. These sections are not normally repeated.

In the preferred embodiment, the exhaust temperature and boost pressure models treat the engine as a steady state flow pump. Therefore, engine constants (for example, BORE) are adjusted from actual values and are representative of the actual values on that basis.

With reference to FIG. 5, the operation of the exhaust temperature model will be discussed. In a tenth control block 502, the sensor data is read (the first set of engine parameters). In the preferred embodiment, the exhaust temperature model uses the following engine information:

| | |
|---|---|
| engine speed | (SPEED), |
| timing advance | (TIMING), |
| rack position/fuel rate | (RACK), |
| intake manifold pressure | ($P_{intake}$), |
| inlet air temperature | ($T_a$), |
| intake manifold temperature | ($T_{intake}$), |
| coolant temperature | ($t_c$), |
| exhaust temperature | ($t_{probe}$), and |
| fuel temperature | ($t_{fuel}$). |

In an eleventh control block 504, the volumetric efficiency of the engine 102 is calculated. The volumetric efficiency (VOL_EFF) is the mass flow efficiency of the engine 102 as it acts as a positive displacement pump. In the preferred embodiment, the volumetric efficiency of the engine 102 is obtained from an engine performance map. The engine performance map is determined experimentally and the volumetric efficiency is determined as a function of the rack position and the engine speed from the electronic control module 202.

In a twelfth control block 506, the fuel to air ratio of the engine is calculated. In the preferred embodiment, calculating the fuel to air ratio (F/A) is determined by first determining the density of the air at the intake manifold and the mass flow of air to the engine. The density of the air is determined by:

$$d_{air} = P_{intake}/(R_{air} * T_{intake}) \qquad \text{EQU. 1}$$

where $R_{air}$ is the gas constant for air. Note that for $P_{intake}$, the measured value or the modeled value (modeled boost pressure, see below) may be used.

Using the density of air calculated in EQU. 1, the mass flow of air through the engine is determined by:

$$\overline{m}_{air} = VOL\_EFF * d_{air} * VOL\_FL\_RT \qquad \text{EQU. 2}$$

where VOL_FL_RT is the volumetric pumping of the engine and is determined by:

$$VOL\_FL\_RT = \frac{DISPLACEMENT * SPEED * 1 \text{ pump cycle}}{2 \text{ engine rev's}} \qquad \text{EQU. 3}$$

where DISPLACEMENT is the total displacement of the engine and SPEED is the engine speed.

The mass fuel flow, $\overline{m}_{fuel}$ is received from the ECM 202. Preferably, the mass fuel flow is adjusted based on the temperature of the fuel, $t_{fuel}$. The fuel to air ratio is then determined by:

$$F/A = \overline{m}_{fuel}/\overline{m}_{air} \qquad \text{EQU. 4}$$

In a thirteenth control block 508, the indicated power is calculated. The indicated power represents the chemical energy delivered to the pistons 108. To determine the indicated power, first the indicated specific fuel consumption is determined. The indicated specific fuel consumption represents how efficiently fuel is being converted to indicated power. In the preferred embodiment, the indicated specific fuel consumption has units of mass/(indicated power * time), for example, kg/(W * sec) and is determined using a map. The map is determined experimentally and the indicated specific fuel consumption (ISFC) is found as a function of TIMING, RACK, SPEED, and F/A. TIMING is a signal indicative of the position of the flywheel in relation to "top dead center", at which fuel is injected into the engine. Preferably, TIMING is measured in degrees of the flywheel. TIMING, RACK, and SPEED are received from the ECM 202. Second, the pumping power (PP) is determined. PP represents the work done by the engine 102 to pump fluids (gas) from intake to the exhaust manifold and is determined by:

$$PP = (P_{intake} - P_{ex} - (P_{intake} * SPEED^2 * K1)) \qquad \text{EQU. 5A}$$
$$* \frac{SPEED * DISPLACEMENT}{2}$$

where, K1 is an experimentally derived constant and $P_{ex}$ is the pressure of the exhaust gas at the exhaust manifold. In one embodiment, $P_{ex}$, is measured by a sensor (not shown). In another embodiment, $P_{ex}$ is calculated as a function of the mass fuel flow, $\overline{m}_f$, mass air flow, $\overline{m}_a$, inlet temperature, $T_a$, and turbine outlet pressure. Third, the heat loss during the compression/expansion cycle (HIP) is determined by:

$$HIP = K2 * (P_{intake} * K3 + K4) * (K5 * (T_c + (T_{intake} - T_c) * K6) - T_c) \qquad \text{EQU. 5B}$$
$$* \frac{SPEED * DISPLACEMENT}{T_2 * ((T_c + (T_{intake} - T_c) * K6) - K7)}$$

where, K2-K7 are experimentally derived constants. Then, the indicated power can be determined by:

$$IP = \overline{m}_{fuel}/ISFC + PP + HIP. \qquad \text{EQU. 5C}$$

The power consumed by the engine by friction (mechanical losses) and other losses can be determined using a map of friction power versus engine speed. The brake power or the power available at the flywheel of the engine 102 can be determined by subtracting the friction power from the indicated power.

In a fourteenth control block 510, the amount of heat lost through the cylinders 104 is determined. First, an equivalence ratio (ER) is determined by:

$$ER = (F/A)/(F/A_{stoichiometric}) \qquad \text{EQU. 6}$$

where $F/A_{stoichiometric}$ is the theoretical ideal fuel to air ratio at which there is just enough oxygen present to burn all the fuel.

Then, the "effective" gas temperature is determined. The effective gas temperature is a convention representing a temperature relating to an effective wall area. It is assumed that the effective temperature is in contact with an "effective" wall area over the entire four stroke cycle of the engine 102. The effective gas temperature is determined by:

$$Tg = T_g 300 + 0.35(T_{intake} - 300) \qquad \text{EQU. 7}$$

where $T_{g300}$ is the gas temperature, when the intake temperature is 300 K. $T_{g300}$ is determined from an experimentally derived map of $T_{g300}$ versus ER.

Next, the exhaust flow rate ($\bar{m}_{exh}$) is determined by adding the mass flow of the air and the mass flow of the fuel.

The effective wall area is an "imaginary" surface, which is in constant contact with the exhaust gas temperature. In the preferred embodiment, the effective wall area is estimated as the surface area of the combustion chamber 113 at mid or half stroke.

The effective wall area is determined by:

$$A_e = C * [(2*PI*BORE^2/4) + (PI*BORE*L*0.5)], \quad \text{EQU. 8}$$

where BORE is representative of the diameter of the bore, C is the number of cylinders, and L is the stroke length.

The mass flow of exhaust gas divided by the effective wall area is also determined:

$$G = \bar{m}_{exh}/A_e \quad \text{EQU. 9}$$

In order to complete the calculation for the cylinder heat loss, the temperature distribution through the cylinder liner wall is determined. To determine the temperature distribution, the following parameters are calculated:

Viscosity of gas ($\mu_g$) $\mu_g = 2.2515 * 10^{-5} * [T_g * 0.0025]^{0.645}$ EQU. 10

Conductivity of gas ($k_g$) $k_g = 3.3308 * 10^{-2} * [T_g * 0.0025]^{0.796}$ EQU. 11

Convective Coefficient of gas ($h_g$) $h_g = 10.4 * k_g/BORE * (G*BORE/\mu_g)^{0.75}$ EQU. 12

Fourier Number ($F_0$) $F_0 = alpha_w * \Delta t/\Delta x^2$ EQU. 13

Biot Numbers $Bi_g - h_g * \Delta x/k_w$ EQU. 14

$Bi_w - h_{coolant} * \Delta x/k_w$ EQU. 15 where $alpha_w$ is diffusivity of effective wall, $\Delta t$ is the time interval or step for the model, and $\Delta x$ is the width step in effective wall.

With reference to FIG. 6, the temperature of a wall liner is determined for a predetermined number of steps or divisions within the cylinder wall. The steps are equally spaced apart. At startup, the temperature at each spot on the wall is set equal to the coolant temperature, $t_c$. The temperature for each of the interior wall points is then determined by:

$$T_{x,t+\Delta t} = F_0 * (T_{x+1,t} + T_{x-1,t}) + (1-2*F_0) * T_{x,t} \quad \text{EQU. 16}$$

where x represents the current division of the cylinder wall.

The temperature at the gas side surface is then determined by:

$$T_{0,t+\Delta t} = 2*F_o*(T_{1,t} + Bi_g*T_{gas}) + (1-2*F_0 - 2*Bi_g*F_0)*T_{0,t} \quad \text{EQU. 17}$$

The temperature at the coolant side is determined by:

$$T_{n,t+\Delta t} = 2*F_0*(T_{n-1,t} + Bi_c*T_c) + (1-2*F_0 - 2*Bi_c*F_0)*T_{n,t} \quad \text{EQU. 18}$$

The cylinder heat loss is then determined. The cylinder heat loss is the rate at which heat is being expelled by the cylinder head, cylinders, and the pistons. The cylinder heat loss is determined by:

$$Q_{cyl} = -h_g * A_e * (T_{gas} - T_{0,t}) \quad \text{EQU. 19}$$

where $A_e$ is the effective wall area.

The temperature of the exhaust gas being expelled from the cylinder head 112 is a function of the cylinder heat loss, the power delivered to the pistons, the energy in the intake air and the energy in the fuel plus the chemical energy. The cylinder exhaust temperature (fifteenth control block 512) is determined by:

$$T_{ex1} = \frac{Q_{cyl} - iP + \bar{m}_{air}(C_{intake}*T_{intake})}{[\bar{m}_{ex}*C_{ex}]} + \quad \text{EQU. 20}$$

$$\frac{\bar{m}_{fuel}(C_{fuel}*T_{fuel} + LHV)}{[\bar{m}_{ex}*C_{ex}]}$$

where $C_{intake}$, $C_{fuel}$, $C_{ex}$ are the specific heats of the intake air, fuel and exhaust gas, respectively and LHV is the lower heating value of the fuel in BTU/lbs.

The temperature of the exhaust gas must now be adjusted for the heat loss through the manifold. In order to determine the heat loss from the manifold, the following list of parameters are be determined:

Viscosity of exhaust ($\mu_g$) $\mu_g = 2.2515 * 10^{-5} * (T_{ex1} * 0.0025)^{0.645}$ EQU. 21

Conductivity of exhaust ($k_{ex}$) $k_{ex} = 3.3308 * 10^{-2} * (T_{ex1} * 0.0025)^{0.796}$ EQU. 22

Reynolds Number (Re) $Re = \bar{m}_{ex} * D_{man}/(A_{passage} * \mu_g)$ EQU. 23

Prandtl Number (Pr) Pr=0.66 EQU. 24

Convective coefficient $0.023 * Re^{0.8} * Pr^{0.3} * k_{ex}/D_{man}$ EQU. 25 where, $D_{man}$ is the diameter of the manifold and $A_{passage}$ is the cross sectional area of the manifold's passage.

First, the rate of change of the manifold temperature is determined in a sixteenth control block 514. The temperature change is determined as a function of the net energy of the system divided by the specific heat times the mass of the system. The energy into the manifold will be from convection from the exhaust gases. The energy departing will be a two-fold loss, one from natural convection to the manifold surroundings, and the other will be the radiant energy dissipated by the manifold. The change in temperature is determined as:

$$dT/dt = \frac{h_{ex}*A_{si}(T_{ex1} - T_{man}) - h_a*A_{so}(T_{man} - T_a)}{\rho_{man} * vol_{man} * c_{man}} - \quad \text{EQU. 26}$$

$$\frac{\epsilon_{man}\sigma A_{so}(T_{man}^4 - T_a^4)}{\rho_{man} * vol_{man} * c_{man}}$$

where $A_{si}$ and $A_{so}$ are the inner and outer surface areas of the manifold, respectively.

Then, the temperature of the manifold is determined in a seventeenth control block 516. The manifold temperature is a function of the present temperature of the manifold and the rate at which the temperature is predicted to be changing over a period of time, $\Delta t$. The new manifold temperature is determined by:

$$T_{man,t+\Delta t} = T_{man,t} + (3*dT/dt_t - dT/dt_{t-\Delta t})*\Delta t/2. \quad \text{EQU. 27}$$

The amount of heat loss through the manifold can then be determined in an eighteenth control block 518 by:

$$Q_{man} = -h_{ex} * A_{si} * (T_{ex1} - T_{man,t}). \quad \text{EQU. 28}$$

Using the calculated manifold heat loss, the temperature of the exhaust gases as seen at the sensor can be determined by:

$$T_{ex2} = (Q_{man} + \overline{m}_{ex} * C_{ex} * T_{ex1})/\overline{m}_{ex} * C_{ex}). \quad \text{EQU. 29}$$

In order to estimate the temperature measured by the sensor 146, the change in the temperature of the probe is determined as a function of the differential temperature between the probe and the surrounding exhaust gases. The temperature differential is determined by:

$$dT/dt = h_p * A_p * (T_{ex2} - T_p)/(\rho_p * Vol_p * C_{probe}) \quad \text{EQU. 30}$$

where, $A_t$ is the surface area of the probe 146, $\rho_p$ is the density of the probe, $Vol_p$ is the volume of the probe and $C_p$ is the specific heat of the probe.

The estimated probe temperature is determined determined in a nineteenth control block 520 by:

$$T_{p,t+\Delta t} = T_{p,t} + (3*dT/dt_t - dT/dt_{t-\Delta t})*\Delta t/2. \quad \text{EQU. 31}$$

With reference to FIG. 7, the boost pressure computer based model uses compressor and turbine maps, to determine the boost pressure. In the preferred embodiment, the boost pressure model uses the following engine information:

| | |
|---|---|
| engine speed | (SPEED), |
| rack position/fuel rate | (RACK), |
| intake manifold pressure | ($P_{intake}$), |
| inlet air temperature | ($T_a$), |
| intake manifold temperature | ($T_{intake}$), |
| inlet air pressure | ($P_a$), and |
| exhaust temperature | ($t_{probe}$). |

In a twentieth control block 702, the rotational speed of the turbocharger is initialized. In the preferred embodiment, the turbocharger speed is initialized to 30 Krpm. In determining the boost pressure, the turbocharger speed is updated. Since the turbocharger speed is arbitrarily initialized, it takes the model a short period of time for the turbocharger speed to come up to the actual turbocharger speed. In a twenty-first control block 704, the mass flow ($\overline{m}_{af}$) into the engine 102 is determined. In the preferred embodiment, the mass flow into the engine is equal to the sum of the mass fuel flow and the mass air flow, $\overline{m}_{fuel}$, $\overline{m}_{air}$ from the exhaust temperature model. In a twenty-second control block 705, the compressor output pressure is determined as a function of the mass air flow ($\overline{m}_{air}$), the inlet temperature and pressure, $T_a$, $P_a$, and the turbine speed. In the preferred embodiment, the compressor output pressure (COP) is determined from a map derived from manufacturer data. In a twenty-third control block 706, the boost pressure is determined by:

$$BOOST = COP - (\overline{m}_{af}^2 * K8) - K9. \quad \text{EQU. 32}$$

where K8 and K9 are experimentally derived constants.
In a twenty-fourth control block 708, the torque applied to the compressor 130 is determined. In the preferred embodiment the compressor torque is determined as a function of the mass air flow, the inlet temperature and pressure, and the turbine speed.

In the preferred embodiment, the boost pressure and the compressor torque are determined using maps based on manufacturer bench performance data.

In a twenty-fifth control block 710, the turbine torque is determined as a function of a mass exhaust flow ($\overline{m}_{exh}$), the turbine inlet temperature, the turbine temperature ratio, and the turbocharger speed. In a twenty-sixth control block 712, the acceleration of the turbine 132 is determined as a function of the compressor torque, the turbine torque, and the turbo inertia. In a twenty-seventh control block 714, the turbocharger speed is updated as a function of the old speed, the turbocharger acceleration and the time since the last update. The cycle repeats using the updated turbocharger speed.

With reference to FIG. 8, the computer based model of the exhaust temperature is used to indicate what the exhaust temperature, given the current operating characteristics of the engine, should be. The graph of FIG. 8 illustrates how closely the exhaust temperature model tracks or follows the actual exhaust temperature during a sample run. The actual or measured data is shown by a solid line 802 and the modeled value is shown by a dotted line 804.

Figure 9:
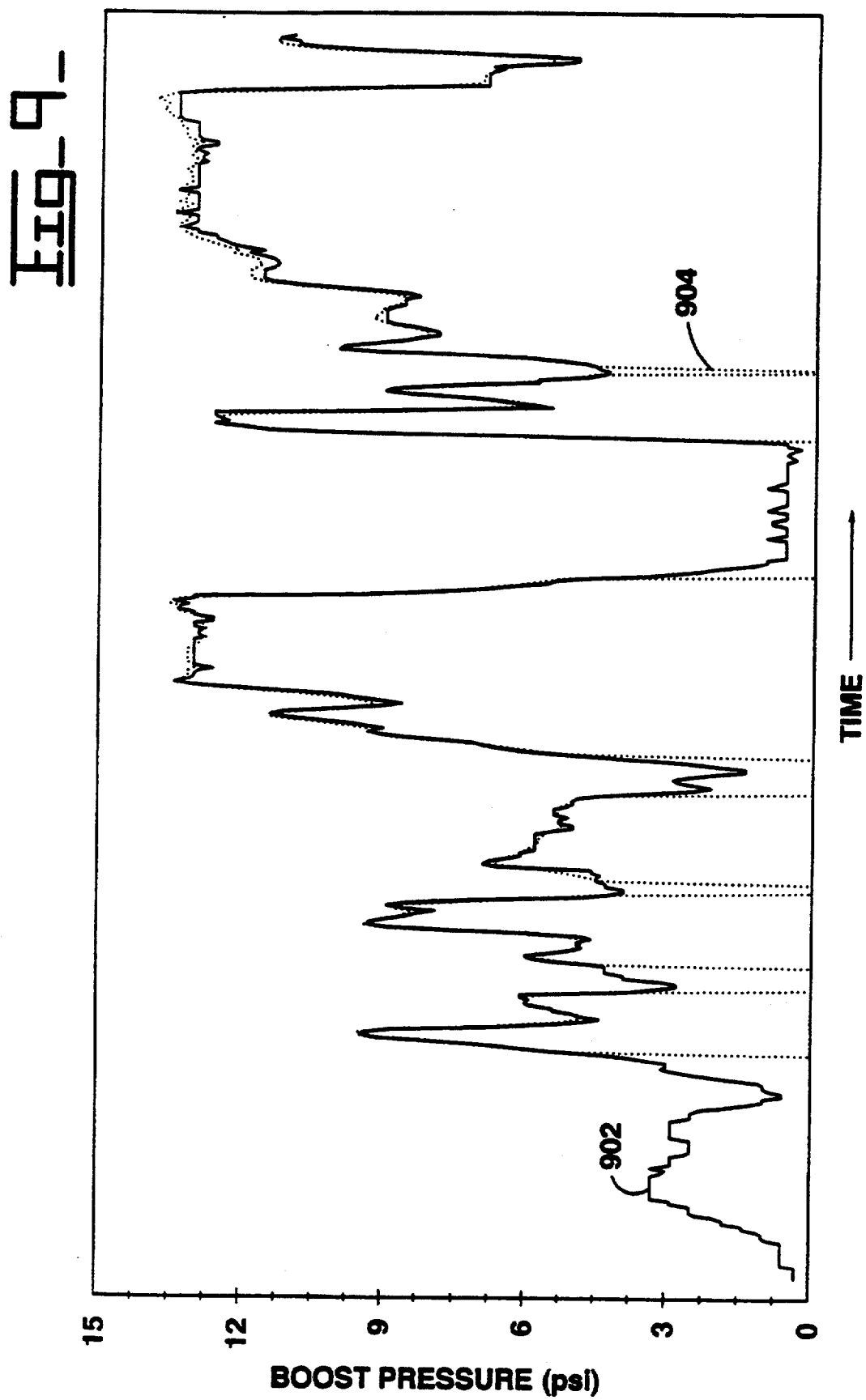
FIG. 9 is a graph of actual boost pressure and modeled boost pressure during operation of the engine versus time.

With reference to FIG. 9, the boost pressure model is used to indicate what the boost pressure of the engine should be given the current operating characteristics. The graph illustrates how closely the boost pressure model tracks the actual boost pressure during a sample run. The actual or measured data is shown by a solid line 902 and the modeled value is shown by a dotted line 904. As shown in the graph, during some periods of time, the boost pressure model does not return an estimate. The reason is that for the given operating conditions no performance maps for the compressor were currently available.

With reference to FIG. 10, the difference between the actual exhaust temperature and the modeled exhaust temperature is used to diagnose the engine. In the graph of FIG. 10, data is averaged on an hourly basis and as shown, the difference (shown by a dotted line) between actual exhaust temperature and modeled exhaust temperature can vary plus or minus 50° F.

With reference to FIG. 11, the difference between the actual boost pressure and the modeled boost pressure is used to diagnose the engine. As with FIG. 10, the data is averaged hourly. As shown by the graph of FIG. 11, the difference (shown by a dotted line) between the actual boost pressure and the modeled boost pressure can vary by plus or minus 1 psi.

The modeled exhaust temperature and boost pressure as determined by the exhaust temperature model and the boost pressure model will shift or vary from the actual values given specific faults of the engine. The table of FIG. 12 shows the effect of several induced faults upon the boost pressure and exhaust temperature models.

With reference to FIG. 13, by eliminating the time dimension and plotting the difference in the actual exhaust temperature and the modeled exhaust temperature versus the actual boost pressure and modeled boost pressure, the models' ability to detect power changes is illustrated.

The data used for FIG. 13 was obtained from tests run in the lab and in the field. First, test data was taken with the engine performing correctly both in the lab and in the field. Then, a number of faults were induced and more data was taken. The test data for each fault was compared to the mean value of the respective normal data. For example, an injector was disabled in the field and test data was taken. The test data was used in the exhaust temperature and boost pressure models. The models first determine the effect of the error on the model (see FIG. 12). The exhaust temperature shift is subtracted from the mean of the exhaust temperature from the normal field data. The boost pressure shift is subtracted from the mean of the boost pressure from the normal field data. The shifts determined for the lab induced faults, that is, loose or tight valve lash, no timing advance, low fuel pressure, intake manifold leak, and bad nozzles, are treated in a similar manner.

The tight scatter of the normal data and the deviations seen under induced faults illustrates the models ability to detect power changes during fault conditions. Moreover, the graph of FIG. 13, illustrates the existence of several regions where a mechanic or operator can begin to look for a fault. Furthermore, the operator, driver or mechanic now has an indication that the engine is operating mechanically as expected.

Furthermore, the graph can be separated into regions based on the data for each type of fault and for normal data. For the purposes of illustration, the regions are shown as circles, however, the exact nature and geometry of the regions are dependent upon, among other parameters, the test data and the engine. Therefore, the present invention is not limited to any predefined size and/or shape of the regions. For the purposes of illustration only, a first region 1300 encompasses the normal lab and field test data. A second region 1302 includes data points taken during periods of induced faults relating to the fuel system. A third region 1304 indicates problems in the engine's timing. A fourth region 1306 is indicative of problems in the air intake system. And a fifth region 1308 indicates of a problem in the engine's valves.

Note that the first region 1300 includes a fault data point. This illustrates that errors induce gradient changes in the power level based on, among other things, the type of the error and the amount of time the error has been present. In other words, in many situations the fault regions 1302-1308 and the normal region overlap 1300.

As discussed above, the models compare the actual exhaust temperature and boost pressure values to modeled values. If there are significant differences (conditions) between the modeled and actual values, the data will fall into one of the fault regions 1302-1308.

With reference to FIGS. 4 and 13A, the diagnostic controller 206 includes means 1402 for producing an acceptable signal in response to a predetermined condition and for producing an error signal in response to other predetermined conditions.

In one embodiment, the indicator means includes an operator indicator. The operator indicator includes a lamp, light, light emitting diode (LED) or similar device for signalling the presence of any error.

In another embodiment, the indicating means includes a means for producing a visual representation of a graph, similar to FIG. 13. The graph producing means may include, among other things, a printer, a plotter, or a video screen or any similar device.

In a still further embodiment, the indicating means is adapted to controllably display graphs illustrating the actual and modeled values versus time and/or the differences between the actual and modeled values (see FIGS. 8-11).

INDUSTRIAL APPLICABILITY

With reference to the drawings and in operation, the present invention is adapted to provide diagnostic capabilities to a vehicle's engine. Ideally, the models are run on an on-board computer for real-time modeling and diagnostic capabilities.

The computer based models receive sensor information from a plurality of sensors. Some of the sensor information and other engine parameters may be received from other modules that may already be on the vehicle. Optionally, the sensor information may be stored in memory for later processing and diagnostics or for further analysis. The amount of data stored may be considerably reduced by storing averages over a certain period of time and/or by storing data only under certain conditions, for example, a range of load on the engine or by rack position.

As described above, the sensor information is used to determine an estimated or modeled value of the engine exhaust temperature and boost pressure. These modeled values are compared with the actual values. Any deviation from the modeled values may be indicative of a problem.

If the values do deviate, the differences are compared with a number of fault conditions or regions. The deviations may fall into one or more of the regions indicating the general location of a fault or possible fault. Preferably, the present invention is adapted to give an immediate fault signal so that no further damage or a prevention of damage may occur.

In this manner, the present invention is adapted to provide onboard diagnostic capabilities and furthermore, may be able to detect failures before the operator feels or senses any significant performance loss.

Other aspects, objects, and advantages of this invention can be obtained from a study of the drawings, the disclosure, and the appended claims.

We claim:

1. A method for diagnosing an engine, including the steps of:

sensing a first operating characteristic of said engine and responsively delivering a first operating characteristic signal;

sensing at least one parameter of said engine and responsively producing at least one parameter signal;

receiving said at least one parameter signal and responsively determining a modeled value of said first operating characteristic;

receiving said first operating characteristic signal, comparing said first operating characteristic signal and said first operating characteristic modeled value and responsively producing a first difference signal;

sensing a second operating characteristic of said engine and responsively delivering a second operating characteristic signal;

sensing at least one other parameter of said engine and responsively producing at least one other parameter signal;

receiving said at least one other parameter signal and responsively determining a modeled value of said second operating characteristic;

receiving said second operating characteristic signal, comparing said second operating characteristic signal and said second operating characteristic modeled value and responsively producing a second difference signal; and receiving said first and second difference signals, comparing said first and second difference signals, and responsively diagnosing said engine.

2. A method, as set forth in claim 1, including the step of storing said at least one parameter signal and said at least one other parameter signal in a time history data file.

3. A method, as set forth in claim 2, including the step of producing a visual representation of said time history data file.

4. A method, as set forth in claim 1, including the step of storing said first and second difference signals in a time history data file.

5. A method, as set forth in claim 4, wherein said time history data file includes a series of averages of said first and second difference signals.

6. A method, as set forth in claim 5, wherein each of said averages is taken over a predetermined amount of time.

7. A method, as set forth in claim 4, including the step of producing a visual representation of said time history data file.

8. A method, as set forth in claim 1, wherein said engine includes a plurality of cylinders, an intake manifold, and an exhaust manifold and wherein said first operating characteristic is the temperature of exhaust gases in said exhaust manifold.

9. A method, as set forth in claim 8, wherein the step of sensing at least one parameter of said engine includes the step of sensing a first set of parameters of said engine.

10. A method, as set forth in claim 9, wherein said first set of parameters includes the pressure of said intake manifold, the temperature of said intake manifold, and the temperature of fuel delivered to said engine.

11. A method, as set forth in claim 9, including the step of storing said first set of parameters in a time history data file.

12. A method, as set forth in claim 11, including the step of producing a visual representation of said time history data file.

13. A method, as set forth in claim 11, wherein said time history data file includes averages of said operating characteristic signals over a predetermined time period.

14. A method, as set forth in claim 9, including the step of storing said first and second operating characteristic modeled values in a time history data file.

15. A method, as set forth in claim 14, wherein said time history data file includes a series of averages of said modeled values.

16. A method, as set forth in claim 15, wherein each of said averages is taken over a predetermined amount of time.

17. A method, as set forth in claim 14, including the step of producing a visual representation of said time history data file.

18. A method, as set forth in claim 9, including the step of storing said first and second operating characteristic signals in a time history data file.

19. A method, as set forth in claim 18, including the step of producing a visual representation of said time history data file.

20. A method, as set forth in claim 1, wherein said engine includes a turbocharger and said second operating characteristic is a boost pressure associated with said turbocharger.

21. A method, as set forth in claim 20, wherein the step of sensing at least one other parameter of said engine includes the step of sensing a second set of parameters of said engine.

22. A method, as set forth in claim 20, wherein said turbocharger includes a compressor, said engine includes an intake manifold, an exhaust manifold, and an air filter connected to said compressor and wherein said second set of parameters includes the pressure of said intake manifold, the temperature of said intake manifold, the temperature and pressure of the air between said compressor and said air filter, and the temperature of said exhaust manifold.

23. A method, as set forth in claim 1, wherein said step of diagnosing said engine includes the step of producing an error signal as a function of the magnitudes of said first and second difference signals.

24. A method, as set forth in claim 1, wherein said step of diagnosing said engine includes the steps:
producing an acceptable signal in response to a first set of conditions of said first and second difference signals;
producing a fuel system error signal in response to a second set of conditions of said first and second difference signals;
producing a valve error signal in response to a third set of conditions of said first and second difference signals;
producing an air error signal in response to a fourth set of conditions of said first and second difference signals; and
producing a timing error signal in response to a fifth set of conditions of said first and second difference signals.

25. A method for diagnosing an engine having an exhaust manifold and a turbocharger, including the steps of:
sensing an exhaust temperature of said exhaust manifold and responsively delivering an exhaust temperature signal;
sensing at least one parameter of said engine and responsively producing at least one parameter signal;
receiving said at least one parameter signal and responsively determining a modeled exhaust temperature value;
receiving said exhaust temperature signal, comparing said exhaust temperature signal and said modeled exhaust temperature value and responsively producing a first difference signal;
sensing a boost pressure of said turbocharger and responsively delivering a boost pressure signal;
sensing at least one other parameter of said engine and responsively producing at least one other parameter signal;
receiving said at least one other parameter signal and responsively determining a modeled boost pressure value;
receiving said boost pressure signal, comparing said boost pressure signal and said modeled boost pressure value and responsively producing a second difference signal; and receiving said first and second difference signals, comparing said first and second difference signals, and responsively diagnosing said engine.

26. A method, as set forth in claim 25, including the step of storing said first and second difference signals in a time history data file.

27. A method, as set forth in claim 26, wherein said time history data file includes a series of averages of said first and second difference signals.

28. A method, as set forth in claim 27, wherein each of said averages is taken over a predetermined amount of time.

29. A method, as set forth in claim 28, including the step of producing a visual representation of said time history data file.

30. A method, as set forth in claim 25, wherein said engine includes a plurality of cylinders, each cylinder having a corresponding piston and wherein the step of determining a modeled exhaust temperature value includes the steps:

determining a mass flow efficiency of said engine and responsively producing a volumetric efficiency signal;

determining a fuel to air ratio and responsively producing a fuel to air ratio signal;

receiving said fuel to air ratio signal and said volumetric efficiency signal, responsively determining the power delivered to the pistons of said engine, and producing an indicated power signal indicative of said determined power;

receiving said indicated power signal, responsively determining the heat lost through said cylinders, and producing a cylinder heat loss signal indicative of said determine lost heat;

receiving said cylinder heat loss signal, responsively determining the temperature of the exhaust gas and producing a first temperature signal indicative of said determined temperature;

calculating the temperature of said exhaust manifold and responsively producing a manifold temperature signal;

receiving said first temperature signal and said manifold temperature signal, responsively determining the heat lost through said exhaust manifold, and producing a manifold heat loss signal indicative of said determined heat lost; and receiving said manifold heat loss signal, responsively determining a probe exhaust temperature, and producing a probe exhaust temperature signal indicative of said determined probe exhaust temperature.

31. A method, as set forth in claim 25, wherein said step of determining a modeled boost pressure value includes the steps of:

initializing a turbine speed of said turbocharger to a predetermined value;

determining the mass flow rate into the engine and responsively producing a mass flow signal;

sensing a filtered air pressure and temperature and responsively producing filtered air pressure and temperature signals, respectively;

sensing an intake manifold air temperature and responsively producing an intake manifold air temperature signal;

sensing an exhaust temperature and responsively producing an exhaust temperature signal;

receiving said mass flow signal, turbine speed, said filtered air pressure and temperature signals, and said intake manifold air temperature signal and responsively producing a boost pressure signal.

32. A method, as set forth in claim 31, including the steps of:

updating said turbine speed value;

receiving said mass flow signal, turbine speed, said filtered air pressure and temperature signals, and said intake manifold air temperature signal and responsively producing an updated boost pressure signal.

33. A method, as set forth in claim 25, wherein the step of sensing at least one parameter of said engine includes the step of sensing a first set of parameters of said engine.

34. A method, as set forth in claim 33, wherein said first set of parameters includes an intake manifold pressure, an intake manifold temperature, and the temperature of fuel delivered to said engine.

35. A method, as set forth in claim 34, including the step of storing said first set of parameters in a time history data file.

36. A method, as set forth in claim 35, including the step of producing a visual representation of said time history data file.

37. A method, as set forth in claim 34, including the step of storing said first and second operating characteristic modeled values in a time history data file.

38. A method, as set forth in claim 37, including the step of producing a visual representation of said time history data file.

39. A method, as set forth in claim 34, including the step of storing said first and second operating characteristic signals in a time history data file.

40. A method, as set forth in claim 39, including the step of producing a visual representation of said time history data file.

41. A method, as set forth in claim 25, wherein the step of sensing at least one other parameter of said engine includes the step of sensing a second set of parameters of said engine.

42. A method, as set forth in claim 41, wherein said turbocharger includes a compressor, said engine includes an intake manifold, an exhaust manifold, and an air filter connected to said compressor and wherein said second set of parameters includes the pressure of said intake manifold, the temperature of said intake manifold, the temperature and pressure between said compressor and said air filter, and the temperature of said exhaust manifold.

43. A method, as set forth in claim 41, including the step of storing said second set of parameters in a time history data file.

44. A method, as set forth in claim 43, including the step of producing a visual representation of said time history data file.

45. A method, as set forth in claim 25, wherein said step of diagnosing said engine includes the step of producing an error signal in response to the magnitudes of said first and second difference signals.

46. A method, as set forth in claim 25, wherein said step of diagnosing said engine includes the steps:

producing an acceptable signal in response to a first set of conditions of said first and second difference signals;

producing an fuel system error signal in response to a second set of conditions of said first and second difference signals;

producing a valve error signal in response to a third set of conditions of said first and second difference signals;

producing an air manifold error signal in response to a fourth set of conditions of said first and second difference signals; and producing a timing error signal in response to a fifth set of conditions of said first and second difference signals.

47. A method for diagnosing an engine having a turbocharger and a plurality of cylinders, each cylinder having an associated piston, including the steps of:

determining the volumetric efficiency of said engine and responsively producing a volumetric efficiency signal indicative of the mass flow efficiency of said engine;

determining the fuel to air ratio and responsively producing a fuel to air ratio signal;

receiving said fuel to air ration signal and said volumetric efficiency signal, responsively determining the power delivered to the pistons, and producing a brake power signal indicative of said determined power;

determining the heat lost through said cylinders and responsively producing a cylinder heat loss signal;

receiving said cylinder heat loss signal, responsively determining the temperature of the exhaust gas and producing a modeled exhaust temperature signal indicative of said determined temperature;

sensing the actual exhaust temperature and responsively producing an actual exhaust temperature signal;

receiving said modeled exhaust temperature signal and said actual exhaust temperature signal, comparing said modeled and actual exhaust temperature signals and responsively producing a first difference signal;

initializing a turbine speed to a predetermined value;

determining an intake manifold air temperature and responsively producing an intake manifold air temperature signal, respectively;

receiving said intake manifold air temperature signal and responsively determining the mass flow rate into the engine and responsively producing a mass flow signal;

determining a filtered air pressure and temperature and responsively producing filtered air pressure and temperature signals, respectively;

receiving said mass flow signal, turbine speed, said filtered air pressure and temperature signals, and said intake manifold air temperature signal and responsively producing a modeled boost pressure signal;

sensing an actual boost pressure and responsively producing an actual boost pressure signal;

receiving said modeled and actual boost pressure signals and responsively producing a second difference signal;

receiving said first and second difference signals, comparing said first and second difference signals, and responsively diagnosing said engine.

48. A method, as set forth in claim 47, wherein engine includes an exhaust manifold and said step of producing a modeled exhaust temperature signal includes the steps of:

calculating a temperature of said exhaust manifold and responsively producing a manifold temperature signal;

receiving said manifold temperature signal, responsively determining the heat lost through said exhaust manifold, and producing a manifold heat loss signal indicative of said determined heat lost;

and wherein said modeled exhaust temperature signal is a function of said manifold heat loss signal.

49. A method, as set forth in claim 47, including the steps of:

updating said turbine speed value;

receiving said mass flow signal, turbine speed, said filtered air pressure and temperature signals, and said intake manifold air temperature signal and responsively producing an updated boost pressure signal.

50. A method, as set forth in claim 47, wherein said engine includes a fuel delivery system and said step of determining the volumetric efficiency of said engine includes the step of determining the amount of fuel delivered to said engine and an engine speed of said engine and wherein said volumetric efficiency is determined as a function of said delivered fuel and engine speed.

51. A method, as set forth in claim 47, wherein said engine includes a rack for controlling the fuel supplied to the engine and said step of determining the volumetric efficiency of said engine includes the step of determining a rack position and an engine speed of said engine, and wherein said volumetric efficiency of said engine is determined by an engine performance map using said rack position and engine speed.

52. A method, as set forth in claim 47, wherein said engine includes an intake manifold and said fuel to air ratio calculating step includes the steps of:

sensing the temperature and pressure of the air flow in the engine and responsively producing an air temperature signal;

receiving said air temperature and pressure signals and responsively calculating an air density signal;

receiving said air density signal and said volumetric efficiency signal and responsively producing an air flow mass signal; and sensing the mass fuel flow of fuel into said engine and responsively producing a mass fuel flow signal.

53. A method, as set forth in claim 47, wherein the step of determining said brake power signal includes the steps of:

receiving a timing signal, said rack signal, said speed signal, and said fuel to air ratio signal and responsively producing a indicated specific fuel consumption signal indicative of the efficiency of fuel consumption;

receiving said mass fuel flow signal and said indicated specific fuel consumption signal and responsively producing an indicated power signal; and receiving said engine speed signal and responsively producing a friction signal indicative of the mechanical friction losses in the engine;

and wherein said brake power signal is determined as a function of said indicated power signal and said friction power signal.

* * * * *

UNITED STATES PATENT AND TRADEMARK OFFICE
CERTIFICATE OF CORRECTION

PATENT NO. : 5,377,112
DATED : December 27, 1994
INVENTOR(S) : William L. Brown, Jr. et al It is certified that error appears in the above-identified patent and that said Letters Patent is hereby corrected as shown below:

In Claim 47, column 17, line 1, "ration" should be --ratio --.

Signed and Sealed this

Twenty-third Day of May, 2000

Attest:

Q. TODD DICKINSON

*Attesting Officer*  *Director of Patents and Trademarks*